(12) United States Patent
Wennemer et al.

(10) Patent No.: US 9,182,853 B2
(45) Date of Patent: Nov. 10, 2015

(54) FUNCTION SELECTION BY DETECTING RESONANT FREQUENCIES

(71) Applicant: BLACKBERRY LIMITED, Waterloo (CA)

(72) Inventors: Dietmar Frank Wennemer, St. Agatha (CA); Peter Mankowski, Waterloo (CA); Wael Jendli, Burnaby (CA); Timothy Kyowski, Kitchener (CA); Chris Forrester, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 135 days.

(21) Appl. No.: 14/011,511

(22) Filed: Aug. 27, 2013

(65) Prior Publication Data
US 2015/0062090 A1 Mar. 5, 2015

(51) Int. Cl.
| G06F 3/043 | (2006.01) |
| G06F 1/16 | (2006.01) |
| G06T 11/40 | (2006.01) |
| G06F 3/0488 | (2013.01) |
| G06T 11/60 | (2006.01) |

(52) U.S. Cl.
CPC .............. *G06F 3/0433* (2013.01); *G06F 1/169* (2013.01); *G06F 3/0436* (2013.01); *G06F 3/04883* (2013.01); *G06T 11/40* (2013.01); *G06T 11/60* (2013.01); *G06F 2200/1636* (2013.01)

(58) Field of Classification Search
None
See application file for complete search history.

(56) References Cited

U.S. PATENT DOCUMENTS

| 5,550,738 | A | 8/1996 | Bailey et al. |
| 5,675,321 | A | 10/1997 | McBride |
| 7,119,800 | B2 | 10/2006 | Kent et al. |
| 7,486,950 | B2 | 2/2009 | Losch |
| 7,856,203 | B2 | 12/2010 | Lipovski |
| 8,126,435 | B2 | 2/2012 | George |
| 8,165,881 | B2 | 4/2012 | Kirsch et al. |
| 8,401,578 | B2 | 3/2013 | Inselberg |
| 8,442,511 | B2 | 5/2013 | Woods et al. |
| 2003/0160692 | A1 | 8/2003 | Nonaka |
| 2006/0211499 | A1 | 9/2006 | Bengtsson et al. |
| 2008/0198145 | A1 | 8/2008 | Knowles et al. |
| 2009/0221279 | A1 | 9/2009 | Rutledge |
| 2010/0216509 | A1 | 8/2010 | Riemer et al. |
| 2011/0018814 | A1 | 1/2011 | Kruglick |
| 2011/0065375 | A1 | 3/2011 | Bradley |
| 2011/0096036 | A1 | 4/2011 | McIntosh et al. |
| 2011/0109553 | A1* | 5/2011 | Tsao et al. ............ 345/163 |
| 2013/0044100 | A1 | 2/2013 | King |
| 2013/0045689 | A1 | 2/2013 | Grost et al. |

FOREIGN PATENT DOCUMENTS

DE 19801566 A1 10/1999

OTHER PUBLICATIONS

Mankowski, Peter, et al.; U.S. Appl. No. 13/915,886, filed Jun. 12, 2013; Title: Method of Processing an Incoming Communication Signal at a Mobile Communication Device.

(Continued)

*Primary Examiner* — Muhammad N Edun
(74) *Attorney, Agent, or Firm* — Conley Rose, P.C.; J. Robert Brown, Jr.

(57) ABSTRACT

A function of an electronic device is selected by detecting a resonant frequency generated by a tapping on a selection region of a device housing. The function of the device is selected based on the detected resonant frequency.

18 Claims, 10 Drawing Sheets

(56) References Cited

OTHER PUBLICATIONS

Riskedal, Espen; "Drum Analysis"; University of Bergen; Department of Informatics; https://bora.uib.no/bitstream/handle/1956/1705/Masteroppgave%E2%80%90riskedal.pdf?sequence=1; Feb. 11, 2002; 106 pages.

European Extended Search Report; Application No. 13171619.3; Nov. 4, 2013; 10 pages.

European Extended Search Report; Application No. 14182529.9; Nov. 10, 2014; 9 pages.

Office Action dated Mar. 2, 2015; U.S. Appl. No. 13/915,886 filed Jun. 12, 2013; 27 pages.

Final Office Action dated Aug. 12, 2015; U.S. Appl. No. 13/915,886, filed Jun. 12, 2013; 13 pages.

\* cited by examiner

FUNCTION SELECTION BY DETECTING RESONANT FREQUENCIES

BACKGROUND

Electronic devices typically use buttons, switches and other moving parts to make selections. Buttons include mechanical buttons and graphical buttons displayed on a touch-screen display. When mechanical buttons are used, multiple manufacturing steps may be employed to make the buttons, and over time the buttons wear down. In addition, foreign objects or particles may enter spaces between the buttons and a housing of the devices, which can result in device damage.

Some electronic devices are designed without buttons or touch-screens. These devices are operated by connecting the device to a separate controller via a wired or wireless data communications link. However, even in devices in which no user interface is typically required or desired, it would be desirable to have the ability to perform basic operations, such as on/off, reset or other basic functions, without the need to connect the device to another electronic device to perform the function.

SUMMARY OF THE DISCLOSURE

According to an aspect of the disclosure, there is provided a method of selecting a function of a device, which includes detecting a resonant frequency generated by a tapping on a selection region of a device housing, and selecting a function of the device based on the detected resonant frequency.

According to another aspect of disclosure, an electronic device includes a device housing having a selection region including a first selection feature and a second selection feature. The first selection feature is configured to generate a different resonant frequency than the second selection feature based on a tapping force being applied to the first and second selection features. A sensor detects a resonant frequency generated by the first and second selection features, and a processing circuit receives sensor data from the sensor corresponding to the detected resonant frequency. The processing circuit selects a function of the electronic device based on the sensor data corresponding to the detected resonant frequency.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
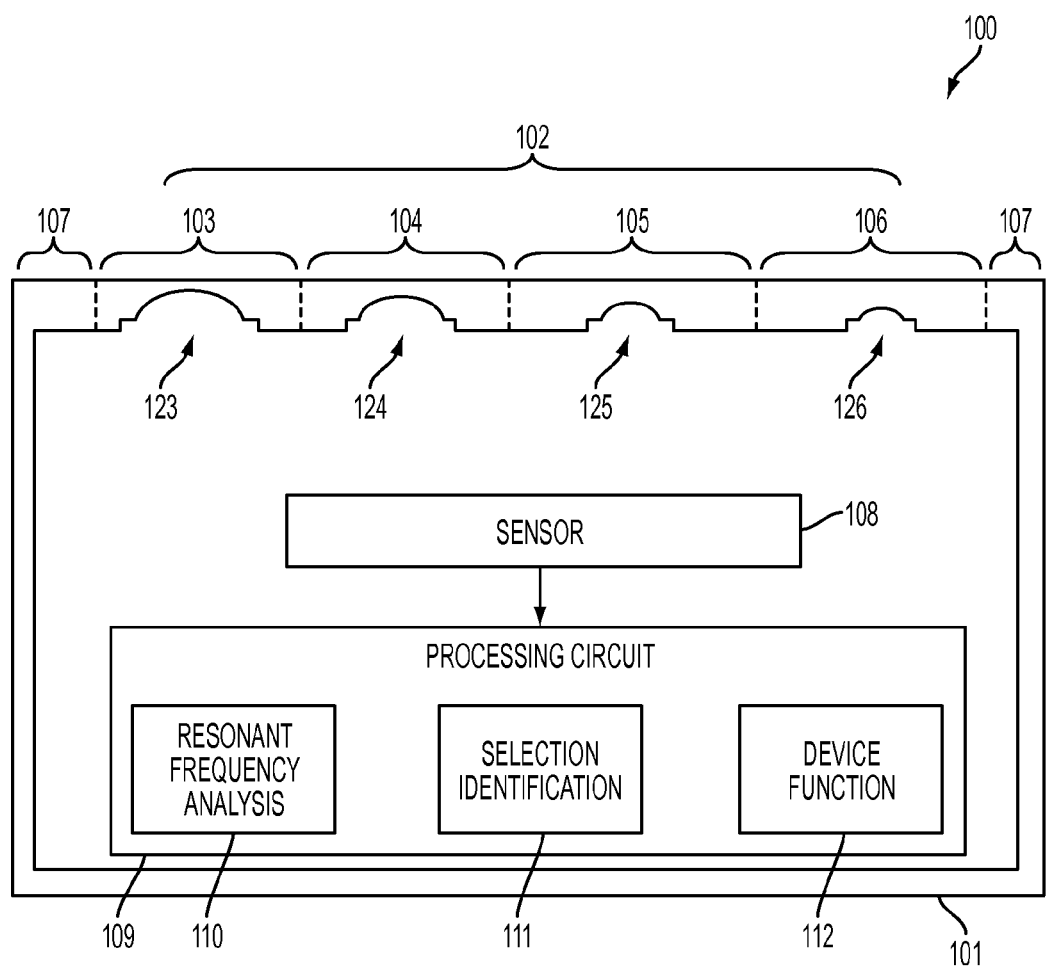
FIG. 1 illustrates an electronic device according to an aspect of the disclosure.

FIG. 1 illustrates an exemplary electronic device 100 according to an aspect of the disclosure. The electronic device 100 includes a device housing 101 having a selection region 102. The selection region 102 includes selection sub-regions 103, 104, 105 and 106. Each selection sub-region 103-106 includes a separate selection feature 123, 124, 125 and 126. The selection features 123, 124, 125 and 126 include a distinctive part that can operate to provide a distinctive signal to sensors versus other parts of the housing 101 as described in greater detail herein. As illustrated in FIG. 1, the selection features 123-126 are cavities formed in the device housing 101, and each selection feature 123-126 defines a cavity of a different shape to generate a different resonant frequency when a user taps the selection region 102. The cavities 123-126 have a first, interior cylindrical portion and a second, outer spherical part, e.g., a spherical segment or spherical cap. It will be recognized as within the scope of the present disclosure to include multiple cylindrical portions, which can vary in height and circumference, polygons as cross sections in place of cylindrical geometries and other arcuate geometries.

The device housing 101 also includes non-selection regions 107, which do not include selection features. In one embodiment, the selection region 102 and the non-selection region 107 are both part of a single piece of rigid material. In other words, the selection region 102 and the non-selection region 107 are contiguous and integral with each other. Examples of rigid materials that may form the device housing 101 including the selection region 102 and the non-selection region 107 include plastics and metals, although any other appropriate rigid material may be used. In other words, the entire selection region 102 and non-selection region 107 may be contiguously part of the same piece of plastic or polymer, or contiguously part of the same piece of metal.

The device 100 further includes at least one sensor 108 and processing circuit 109. The sensor 108 detects a resonant frequency generated when a source from outside the device 100 taps the selection region 102. Selection identification circuitry 111 receives data corresponding to the detected resonant frequencies and identifies a selection indicated by the resonant frequencies. Since each selection feature 123-126 generates a different resonant frequency, a user can tap a selection sub-region 103-106 to generate a distinct resonant frequency. When the selection sub-region 103-106 is designated as corresponding to a particular function, such as volume up, volume down, power on, power off, left, right, up, down, etc., the selected function may be identified by the detected resonant frequency.

In one embodiment, each selection sub-region 103-106 is designated to correspond to a separate function. In another embodiment, the selection region 102 is used to move a cursor or selector in a direction or to a location based on the location of the tapping on the selection region 102. In such an embodiment, a user may not need to tap on any distinct selection sub-region 103-106, but the sensor 108 detects when a tap is exclusively on one selection sub-region 103-106 and when a tap is on a border of two or more selection sub-regions 103-106. The generated resonant frequency is different at each location on the selection region 102, since taps on the borders of the sub-regions 103-106 generate distinct combinations of resonant frequencies.

The processing circuit 109 includes device function circuitry 112 that performs a device function based on the identified selection. For example, in an embodiment in which the selection region 102 is a volume controller, a tap on the first sub-region 103 may set a volume to a minimum; a tap on a boundary of the first sub-region 103 and the second sub-region 104 may set the volume a step higher; a tap on the second sub-region 104 may set the volume another step higher; etc.

In accordance with an aspect of the disclosure, the resonant frequency analysis circuitry 110, the selection identification circuitry 111 and the device function circuitry 112 include software (e.g., instructions that can be stored in memory) executed by a processor to generate control signals to control the electronics device 100 to perform functions. The resonant frequency analysis circuitry 110, the selection identification circuitry 111 and the device function circuitry 112 may also include additional hardware including logic chips, processing chips, converter chips or any other hardware to perform frequency analysis, comparisons, identification and function control signal generation. Chips can include circuitry. Examples of hardware that make up the processing circuit 109 include one or more processors, memory, logic circuits, comparators, analog-to-digital converters, filter circuits and any other required processing circuitry.

In one embodiment, the sensor 108 includes one or more microphones. In another embodiment, the sensor is an accelerometer. The accelerometer or microphone detects the vibrations in the air generated by tapping the selection region 102 and generates data corresponding to the detected resonant frequency. In another embodiment, the sensor 108 is a gyroscope, which similarly detects vibration corresponding to the resonant frequency. In one embodiment in which the sensor 108 includes one or both of the accelerometer and the gyroscope, the sensor does not include a microphone. The sensor 108 may also receive signals that travel through the housing 101, 201, 301, 401, 501 or 901.

Aspects of the disclosure encompass any device that requires input from an outside source, such as a user or other device capable of physically tapping the selection region 102. In one embodiment, an electronic device implementing a selection region with selection features configured to generate resonant frequencies does not include any other physical touch input mechanisms, such as a capacitive touch pad, a rocker switch, a button, a keypad or keyboard, or any other user input which would permit a user to touch the user input to control the electronic device.

In one embodiment, a selection region is provided on a back of a cellular phone, tablet computer, or other portable personal electronic device. In such an embodiment, the selection features may be formed in a panel that houses or covers the battery of the portable personal electronic device. In one embodiment, the selection region permits a user to select an output volume of the device. In another embodiment, the selection region is provided on a surface of a device that has no user input mechanically-actuated buttons (i.e., where the buttons are physically separate pieces from the housing) or touch-screen.

Figure 2A:
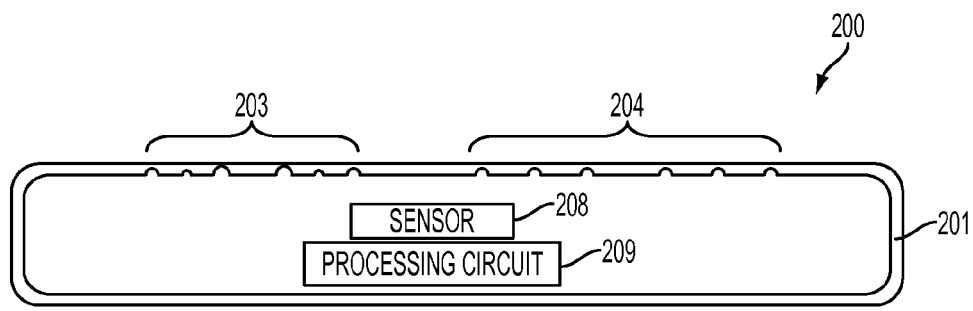
FIG. 2A is a side cross-section view of an electronic device according to an aspect of the disclosure.
Figure 2B:
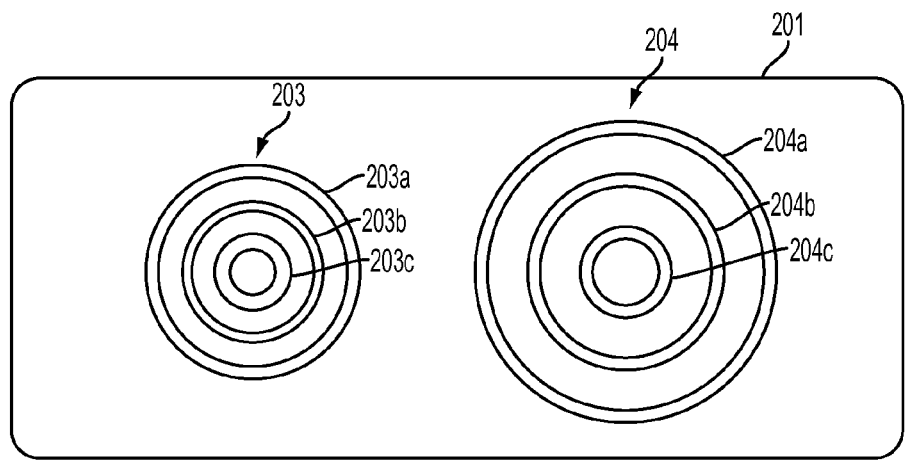
FIG. 2B is a top view of an inside surface of a housing according to an aspect of the disclosure.

FIGS. 2A and 2B illustrate selection regions 203 and 204 of an electronic device 200 according to one embodiment of the disclosure. FIG. 2A illustrates a side cross-sectional view, and FIG. 2B illustrates a top view of the inside surface of the housing 201 including the selection regions 203 and 204.

In FIG. 2A, the selection regions 203 and 204 are part of a back plate or panel of an electronic device 200 including a housing 201, sensor 208 and processing circuit 209. The selection region 203 includes concentric rings 203*a*, 203*b* and 203*c*, which are individual and separate recesses formed in the housing 201. The outer ring 203*a* is thicker than the middle ring 203*b*, and the inner ring 203*c* is thicker than the outer ring 203*a*. In addition, the inner ring 203*c* is deeper than the outer ring 203*a*, which is in turn deeper than the middle ring 203*b*.

The selection region 204 includes concentric rings 204*a*, 204*b* and 204*c*, which are recesses formed in the housing 201. The concentric rings 204*a*-204*c* are substantially the same depth and thickness. As a result, when a user taps on the outer surface of the selection region 203, it generates a different resonant frequency than when the user taps the outer surface of the selection region 204. The different resonant frequencies are detected by the sensor 208, and the processing circuit 209 selects a different function based on the different resonant frequencies.

While FIGS. 2A and 2B illustrate three concentric rings per selection region, embodiments of the disclosure may encompass any number of concentric rings of any thickness. In addition, embodiments of the disclosure may comprise various shapes, including rings, other geometric shapes, such as square shapes, hexagonal shapes, irregular shapes (such as non-symmetrical shapes), or any other shapes.

Figure 3A:
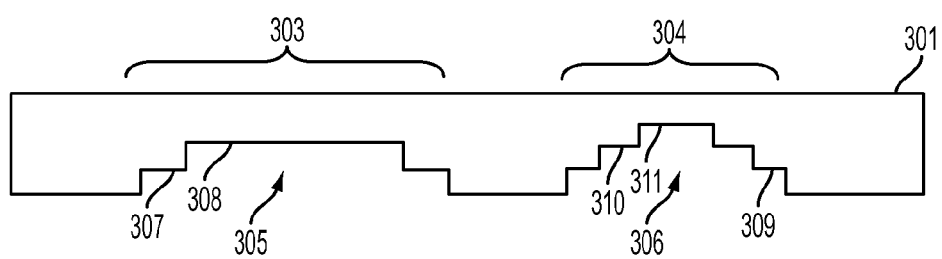
FIG. 3A illustrates a side cross-section view of an electronic device according to another aspect of the disclosure.
Figure 3B:
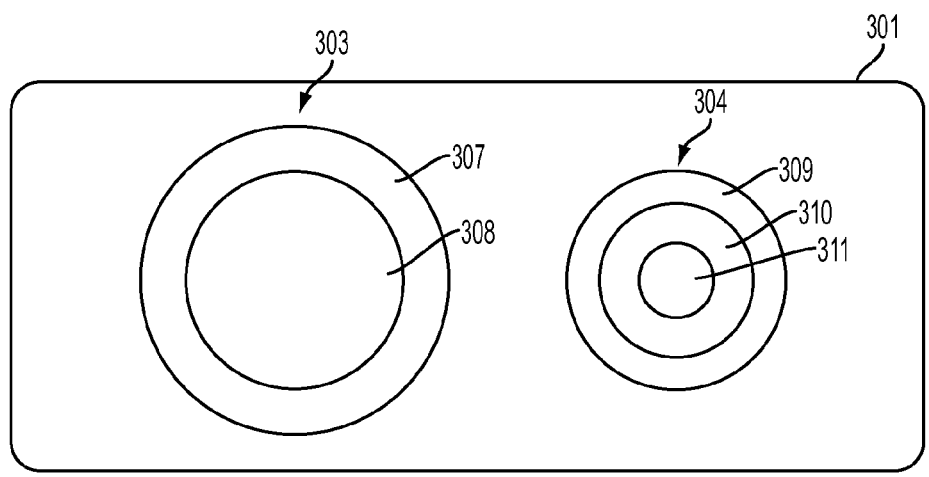
FIG. 3B illustrates a top view of an inside surface of a housing according to another aspect of the disclosure.
Figure 9:
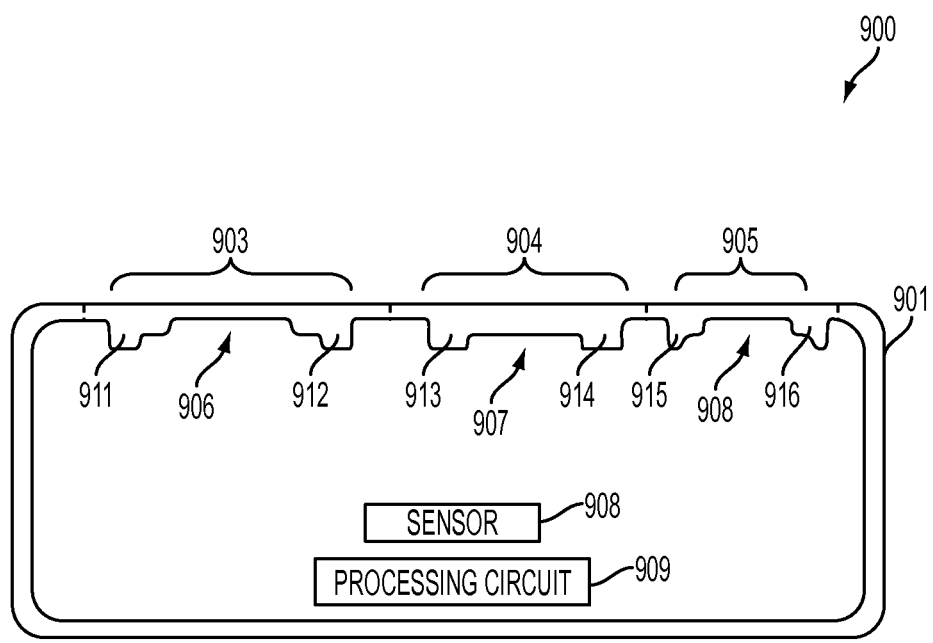
FIG. 9 illustrates an electronic device according to another aspect of the disclosure.

FIGS. 3A and 3B illustrate a selection feature according to another embodiment of the disclosure. FIG. 3A illustrates a side cross-sectional view of a housing plate 301 and FIG. 3B illustrates a top view of the plate 301. In FIGS. 3A and 3B, the selection regions 303 and 304 include cavities or recesses 305 and 306 formed in the housing plate. The recesses 305 and 306 have different volumes to generate different resonant frequencies. The first recess 305 is defined by a first step 307 and a second step 308, which defines the base of the recess 305. The second recess 306 is defined by a first step 309, a second step 310 and a third step 311, which defines the base of the recess 306. Since the recesses 305 and 306 have different shapes, including a different number of steps, steps having different widths, and steps having different heights, the recesses 305 and 306 generate different resonant frequencies when a user taps the selection regions 303 and 304. While FIGS. 3A and 3B show linear walls, it is within the scope of the present disclosure to curve the steps, which may help tune the selection regions 303, 304 and such curved structures may tune other selection regions 103-106 (FIG. 1), 203, 204, (FIG. 2) 403-405, (FIG. 4) 503, 504 (FIG. 5), or 903-905 (FIG. 9).

Figure 4:
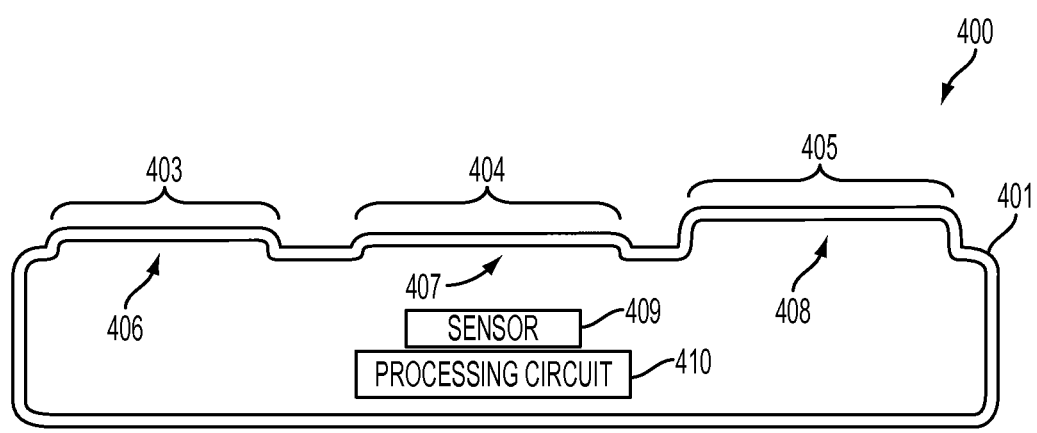
FIG. 4 illustrates an electronic device according to another aspect of the disclosure.

FIG. 4 illustrates an electronic device 400 according to another embodiment of the disclosure. In FIG. 4, the selection regions 403, 404 and 405 are raised features defining cavities 406, 407 and 408, each having a different volume. The selection regions 403, 404 and 405 may have different heights, different widths or diameters, or any other different dimensions such that the cavities 406, 407 and 408 have different volumes to generate different resonant frequencies. In FIG. 4, the selection region 403 has a same height as the selection region 404, but the selection region 404 has a greater length, so that the volume of the cavity 407 is greater than the volume of the cavity 406. The selection region 408 has a height greater than the selection regions 403 and 404 and a diameter different than the regions 403 and 404, so that the volume of the cavity 408 is greater than the volumes of the cavities 406 and 407. The sensor 409 detects a resonant frequency generated by a tapping on the selection regions 403, 404 and 405, and the processing circuit 410 selects a function of the electronic device 400 based on the detected resonant frequency.

Figure 5:
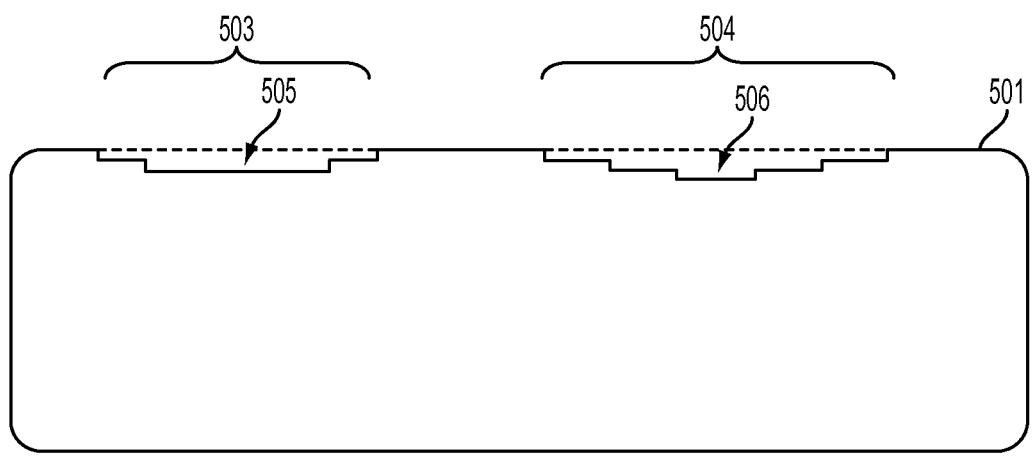
FIG. 5 illustrates an electronic device according to another aspect of the disclosure.

While FIGS. 2A-4 have illustrated selection features formed by cavities on an inside surface of an electronic device, embodiments of the disclosure encompass cavities formed on an outside surface of the electronic device as well. FIG. 5 illustrates an electronic device housing 501 having selection regions 503 and 503 comprising cavities 505 and 506 formed in the outside surface of the housing 501. The dashed lines in FIG. 5 represent the surface of the housing 501 surrounding the cavities 505 and 506. While FIG. 5 illustrates stepped cavities, embodiments of the invention encompass any type of cavity that is used to generate distinct resonant frequencies, including stepped cavities, curved cavities, concentric cavities, cavities having ridges or other protrusions in them, grid-like cavities or any other type of cavity.

In examples described with reference to FIGS. 1-5, there are cavities that form volumes that hollow and, hence, filled with air only. In some examples, the volumes can be, at least partially, filled with a material that is different than the material comprising the housing. At least partially filling the volumes may allow the volumes to be tuned or support other parts, e.g., sensors, circuitry, processors, etc, within the housing and still generate the control signals when impinged or tapped. In the FIG. 5 example, the external cavities can be filled with a material such that the outer surface of the housing at the selection areas are essentially planar or at least continuous.

Figure 6:
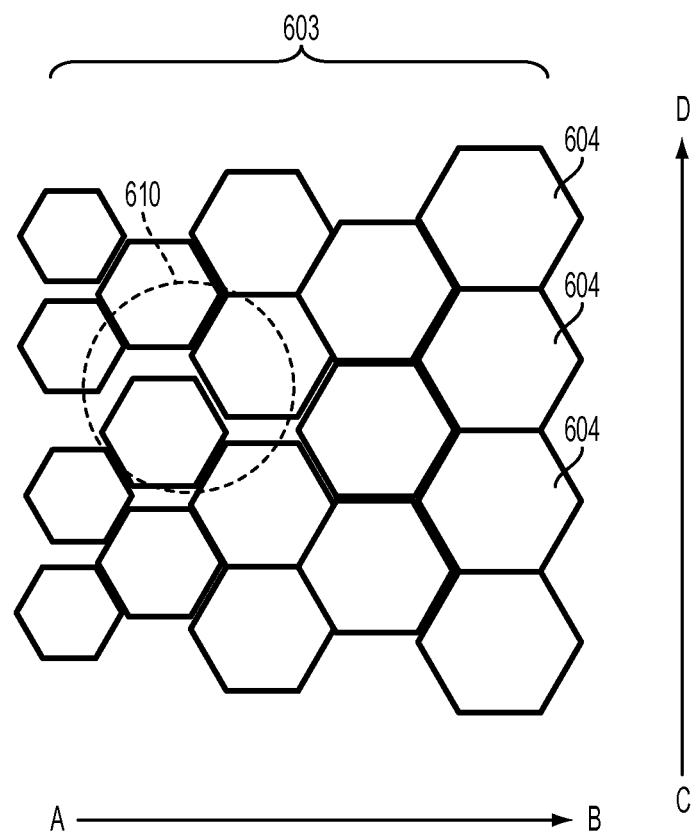
FIG. 6 illustrates a selection region of a housing according to an aspect of the disclosure.
Figure 7:
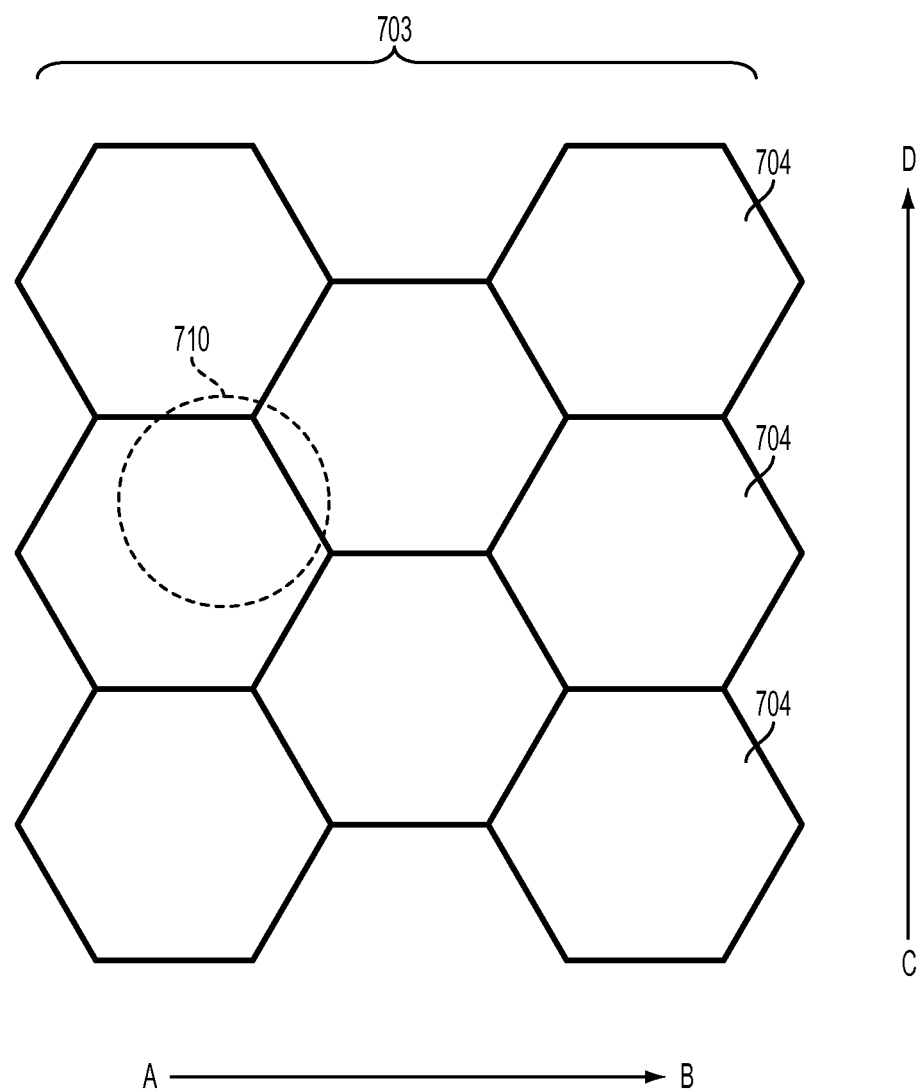
FIG. 7 illustrates a selection region of a housing according to another aspect of the disclosure.

In an exemplary embodiment, a selection region may be made up of a grid of geometric shapes, and the location of a tapping on the selection region is detected by detecting the combination of generated resonant frequencies. FIGS. 6 and 7 illustrate selection regions made up of grids of geometric shapes according to embodiments of the invention.

In FIG. 6, the selection region 603 is made up of a grid of hexagons 604. In one embodiment, a volume of the hexagons in the grid increases in a direction from A to B, in such a manner that the resonant frequency decreases in the direction from A to B. In one embodiment, the volume of hexagons also increases in the direction C to D. Dashed lines 610 represent an approximate size of a finger tap, or between 1 centimeter (cm) to 1.5 cm. In such an embodiment, a single finger tap may overlap four or more hexagons 604, generating four or more resonant frequencies. A sensor may detect the resonant frequencies and a processing circuit may determine a location of the tap on the grid based on the combination of detected resonant frequencies.

FIG. 7 illustrates a selection region 703 made up of a grid of hexagons 704. The hexagons 704 may be of a size such that each hexagon is large enough to encompass a finger tap, or in other words, each hexagon may have a diameter of around 1 cm or larger. In such an embodiment, a single finger tap, represented in FIG. 7 by the circle 710, may primarily be in only one, two, or three hexagons 704, such that a resonant frequency of the one, two, or three hexagons predominates.

While FIGS. 6 and 7 illustrate selection regions made up of hexagonally-shaped cavities, embodiments of the disclosure encompass cavities of any shape and size, as long as the cavities are configured to generate different resonant frequencies, such as by having different volumes. In addition, while FIGS. 6 and 7 illustrate selection regions 603 and 703 having hexagons 604 and 704 of particular sizes, embodiments of the disclosure encompass selection regions having shapes of any desired size, whether smaller than the hexagons 604 of FIG. 6 or larger than the hexagons 704 of FIG. 7.

Figure 8:
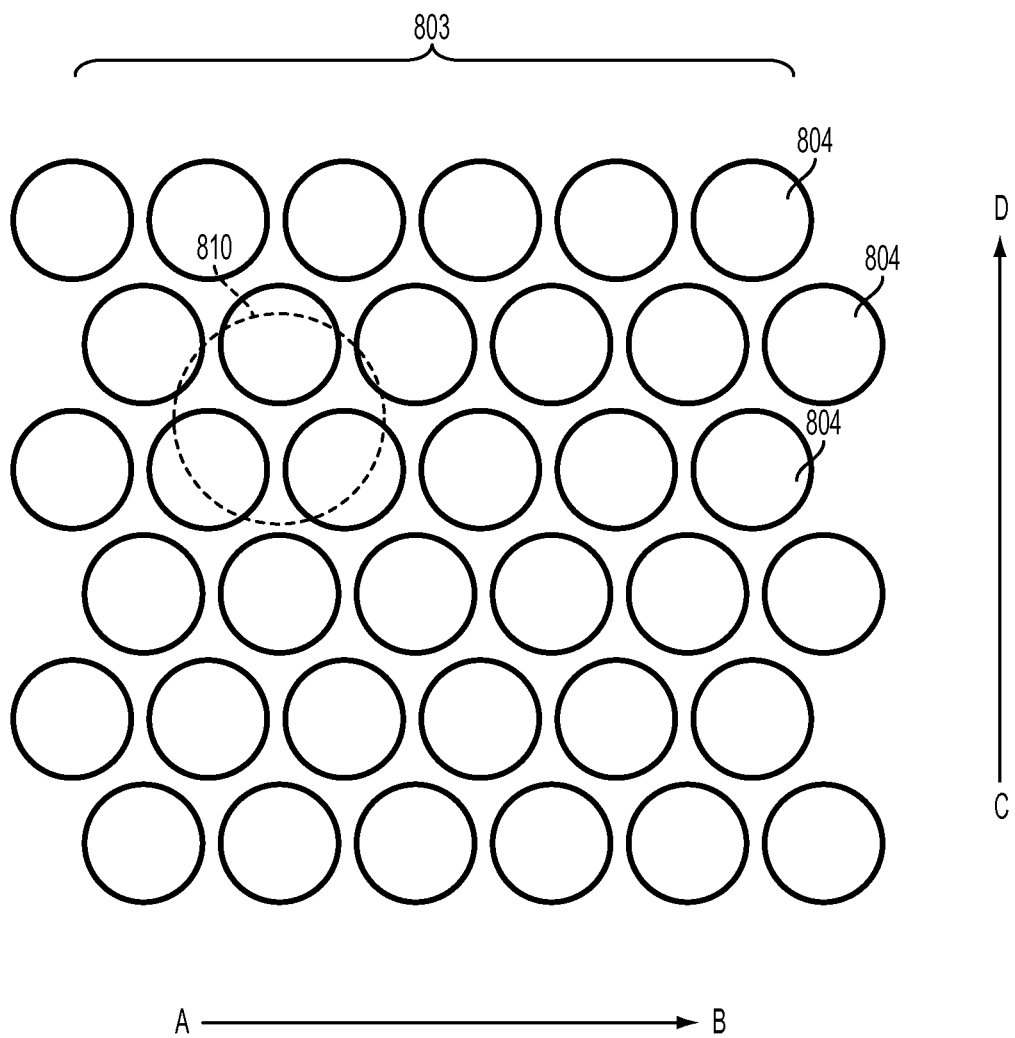
FIG. 8 illustrates a selection region of a housing according to yet another aspect of the disclosure.

FIG. 8 illustrates a selection region 803 made up of circular drums 804 or, in three dimensions, cylindrical drums 804. In one embodiment, the drums 804 increase in volume in a direction from A to B so as to decrease in resonant frequency in the direction from A to B, and in one embodiment, the drums also increase in volume in a direction from C to D. Accordingly, when a user taps the selection region 803 (the location of the user's fingertip represented by the dashed circle 810), the combination of resonant frequencies generated identifies a location of the user tap, and may be used to select a function of an electrical device.

While some examples of embodiments of the disclosure have been illustrated in which cavities are formed in the body of a housing, alternative embodiments also encompass forming ridges that protrude from the body of the housing to generate a particular resonant frequency. FIG. 9 is a sectional view that illustrates an example of an electronic device 900 including a housing 901 including selection regions 903, 904 and 905. The selection regions 903, 904 and 905 include cavities 906, 907 and 908 formed by protrusions 911, 912, 913, 914, 915 and 916. The protrusions 911-916 form drums or other shapes, such that each cavity 906, 907 and 908 generates a different resonant frequency when the respective selection region 903, 904 or 905 is tapped by a user. As discussed previously, the sensor 908 detects the generated resonant frequency, and the processing circuit 909 identifies a function of the electronic device 900 associated with the detected resonant frequency.

Figure 10:
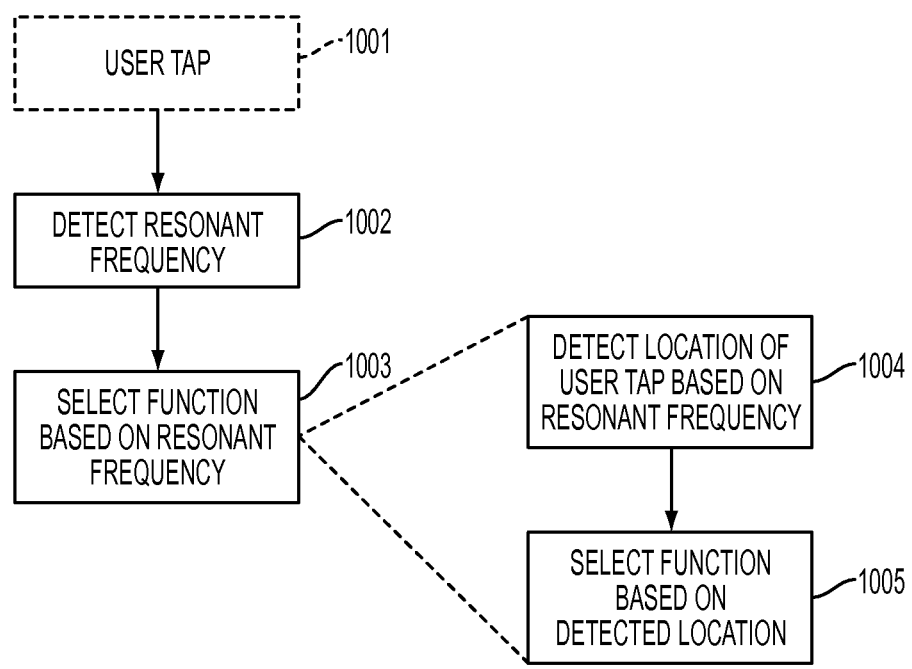
FIG. 10 is a flow diagram of a method according to an aspect of the disclosure.

FIG. 10 is a flow diagram of a method according to an embodiment of the invention. In block 1001, a user or device taps a selection region of a rigid plate or housing. In block 1002, a sensor detects a resonant frequency generated by the tapping. In accordance with the various embodiments of the disclosure, different portions of the plate or housing have selection features that include cavities or recesses formed in the housing, or other shapes formed on the housing. The different selection features generate different resonant frequencies, and in block 1003, a processing circuit identifies a function that corresponds to the detected resonant frequency. Some examples of functions that may be selected include volume up, volume down, power, move left, right, up, or down, reset, and "select," but embodiments of the invention are not limited to these particular functions. Instead, an electronic device may be programmed to associate any desired function with the resonant frequencies generated by tapping on the selection regions of the electronic device.

Blocks 1004 and 1005 illustrate one particular function that may be selected according to one embodiment of the invention, in which tapping on a selection region of a plate or casing is used to provide location information, such as to position a cursor on a screen, or for any other purpose.

In block 1004, the location of the tap on the plate or housing is detected based on the resonant frequency. For example, if a tap is directly over a selection region, then the corresponding resonant frequency is detected and the location corresponding to the tapped selection region is used as location information. However, if a tap is located over a border of two or more selection regions, then the combination of resonant frequencies may be detected and a location corresponding to the combination of resonant frequencies may be used as location information. In such an embodiment, the relative strengths of the resonant frequencies may be used to provide accurate estimates of the location of the tapping.

In block 1005, a function of the electronic device is selected based on the detected location. The function may be the moving of a cursor, scrolling of a screen, adjustments of display characteristics, or any other functions.

According to the various embodiments of the disclosure, regions of a device may be used to make selections that typically cannot accommodate switches, such as the cover of a battery. In addition, devices may be formed of single pieces of solid, rigid materials instead of separate pieces for different keys or buttons. This provides added strength, air and fluid-tight sealing, and attractive design appearance, among other benefits. The embodiments of the disclosure provide for user input in devices which may not typically include a user input, such as electronic devices that are designed only to have wired or wireless input and outputs and power connections.

In accordance with the various embodiments of the disclosure, different resonant frequencies are generated by cavities formed in a housing, or by protrusions from the housing, by tapping selection regions of the housing, and functions of an electronic device are selected based on the different resonant frequencies. The cavities may be of any desired shape and size; may be on an inside surface of the housing or the outside surface of the housing; and may be formed by recesses in the housing or protrusions from the housing. The resonant frequencies may be detected by one or more microphones, or by one or both of an accelerometer and a gyroscope.

The differences in resonant frequencies may be generated by making any one of the following characteristics different between any two selection regions: diameter of a cavity, depth of the cavity, shape of the cavity, number of steps, and thickness of walls. The embodiments of the disclosure also encompass any other means of varying the resonant frequencies generated by different selection regions.

Devices, plates, housings and panels including the selection regions of the embodiments of the disclosure may be formed by any manufacturing means, including three-dimensional printing, injection molding, compression molding, extrusion, or any other means.

The present description describes a tap that can be directed to selection regions 103-106, 203, 204, 303, 304, 403-405, 503-504, and 903-905 in the housing 101, 201, 301, 401, 501 and 901 and can trigger the method described with reference to FIG. 10. A tap can be a gentle strike or a light blow (or blows). The tap can be delivered by a user's finger or hand. The tap can be delivered by another structure, e.g., a stylus, a pen, a pencil, etc. A tap may be less than a one Newton to trigger the selection area to provide a signal that can be sensed by the sensor(s). It is believed that a tenth of a Newton can trigger a signal. The tap can be a fast blow that does not remain on the selection region for an significant period of time so that the physical/mechanical contact does not dampen the signal frequency or amplitude after its creation. Another type of tap can be a long tap that may dampen the signal, which can be sensed by the sensor 108 and circuit 109. Each selection area can produce multiple signals depending on the type of tap in an example. In another example, the selection area can be essentially agnostic to a range of taps and resonate at essentially a same signal even with a range of tap strengths and durations.

The use of sensors to detect a signal as described herein relate to sensing propagating physical waves, e.g., sound, in the housing (in a material, transmission medium) or interior to the housing, i.e., in air. In these embodiments, the signal is not a touchscreen capacitive signal, i.e., not an electrical signal.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selecting a function of a device, comprising:
   detecting a resonant frequency generated by a tapping on a selection region of a device housing; and
   selecting a function of the device based on the detected resonant frequency,
   wherein the selection region includes a first selection feature forming a first shape in the device housing and a second selection feature forming a second shape in the device housing,
   the first and second selection features comprise concentric geometric shapes, and
   the concentric geometric shapes of the first selection feature have at least one of a different number and a different diameter than the concentric geometric shapes of the second selection feature.

2. The method of claim 1, wherein the first selection feature and the second selection feature having different resonant frequencies, and
   wherein selecting the function includes selecting a first function based on detecting a resonant frequency generated by tapping the first selection feature and selecting a second function based on detecting a resonant frequency generated by tapping the second selection feature.

3. The method of claim 2, wherein the first shape has a diameter different than the second shape.

4. The method of claim 1, wherein the resonant frequency is detected by at least one of an accelerometer and a gyroscope.

5. The method of claim 1, wherein the selection region and the device housing surrounding the selection region are part of a same piece of a rigid material.

6. The method of claim 1, wherein selecting a function based on the detected resonant frequency includes estimating a location of the tapping on the selection region.

7. An electronic device, comprising:
   a device housing having a selection region including a first selection feature and a second selection feature, the first selection feature configured to generate a different resonant frequency than the second selection feature in response to tapping each of the first and second selection features;

a sensor to detect the resonant frequencies generated by the first and second selection features; and a processing circuit configured to receive sensor data from the sensor corresponding to the detected resonant frequency from each of the first and second selection features and to select a function of the electronic device based on the sensor data corresponding to the detected resonant frequency, wherein the first selection feature defines a first cavity in the device housing and the second selection feature defines a second cavity in the device housing the first and second cavities are made up of concentric shapes, and at least one of a number, depth and diameter of the concentric shapes of the first cavity is different than the second cavity.

8. The electronic device of claim 7, wherein the first and second cavities having different volumes.

9. The electronic device of claim 8, wherein the first and second cavities are located on an outer surface of the device housing.

10. The electronic device of claim 8, wherein the first and second cavities are located on an inner surface of the device housing.

11. The electronic device of claim 7, wherein the concentric shapes are made up of steps in the device housing, such that an outer shape of the concentric shapes is shallower than an inner shape of the concentric shapes.

12. The electronic device of claim 7, wherein the first and second selection features include protrusions extending outward from a surface of the device housing.

13. The electronic device of claim 7, wherein the selection region and a non-selection region surrounding the selection region are part of a same piece of rigid material.

14. The electronic device of claim 7, wherein the sensor includes an accelerometer.

15. The electronic device of claim 7, wherein the sensor includes a gyroscope.

16. The electronic device of claim 7, wherein the processing circuit is configured to estimate a location of the tapping on the selection region based on the detected resonant frequency.

17. The electronic device of claim 7, wherein the electronic device does not include any of a touchpad, a keypad, and a display screen.

18. An electronic device, comprising:

a device housing having a selection region including a first selection feature and a second selection feature, the first selection feature configured to generate a different resonant frequency than the second selection feature in response to tapping each of the first and second selection features;

a sensor to detect the resonant frequencies generated by the first and second selection features; and a processing circuit configured to receive sensor data from the sensor corresponding to the detected resonant frequency from each of the first and second selection features and to select a function of the electronic device based on the sensor data corresponding to the detected resonant frequency, wherein the first selection feature includes a first end closest to the second selection feature and a second end opposite the first end, and the second selection feature includes a first end closest to the first selection feature and a second end opposite the first end, the second selection feature comprising a grid of cavities, and a volume of the cavities increases in a direction from the second end of the first selection feature to the second end of the second selection feature.

* * * * *